US008596061B2

(12) United States Patent
Albert et al.

(10) Patent No.: US 8,596,061 B2
(45) Date of Patent: Dec. 3, 2013

(54) DECOUPLED INLINE HYDRAULIC BOOSTER

(75) Inventors: Timothy J. Albert, Niles, MI (US); Gregory P. Goodzey, South Bend, IN (US); Kevin K. Johnson, Granger, IN (US)

(73) Assignee: Robert Bosch GmbH, Stuttgart (DE)

( * ) Notice: Subject to any disclaimer, the term of this patent is extended or adjusted under 35 U.S.C. 154(b) by 743 days.

(21) Appl. No.: 12/836,598

(22) Filed: Jul. 15, 2010

(65) Prior Publication Data

US 2012/0011844 A1 Jan. 19, 2012

(51) Int. Cl.
*B60T 13/00* (2006.01)

(52) U.S. Cl.
USPC ........................................ 60/547.1; 91/376 R

(58) Field of Classification Search
USPC ........ 60/547.1, 581, 560, 553, 562; 91/369.2, 91/376 R
See application file for complete search history.

(56) References Cited

U.S. PATENT DOCUMENTS

| | | | |
|---|---|---|---|
| 3,815,364 A * | 6/1974 | Belart et al. .................... | 60/552 |
| 4,075,848 A | 2/1978 | Ueda | |
| 4,181,366 A | 1/1980 | Dobner | |
| 4,685,297 A * | 8/1987 | Brown, Jr. .................... | 60/547.1 |
| 5,096,268 A | 3/1992 | Schiel et al. | |
| 6,007,160 A | 12/1999 | Lubbers et al. | |
| 6,139,119 A | 10/2000 | Otomo | |
| 6,361,122 B2 | 3/2002 | Anderson et al. | |
| 6,434,931 B1 | 8/2002 | Shaw et al. | |
| 2001/0043009 A1 | 11/2001 | Anderson et al. | |
| 2006/0230758 A1 * | 10/2006 | Tagata et al. ................. | 60/547.1 |
| 2007/0013230 A1 | 1/2007 | Yang | |
| 2009/0113890 A1 | 5/2009 | Ebert | |

* cited by examiner

*Primary Examiner* — Edward Look
*Assistant Examiner* — Logan Kraft
(74) *Attorney, Agent, or Firm* — Maginot, Moore & Beck

(57) ABSTRACT

An in-line brake system with a hydraulic booster includes a master cylinder defining a cylinder bore, a master cylinder piston located within the cylinder bore, a transfer piston located within the cylinder bore rearwardly of the master cylinder piston, a transfer piston actuator with a first seat, a sealing member aligned with the first seat, a sealing member spring operably connected to the sealing member and the transfer piston, an input rod aligned with the first seat, a return spring operably connected to the input rod and the transfer piston actuator, a sleeve actuator located within the cylinder bore rearwardly of the master cylinder, and a sleeve spring configured to bias the sleeve actuator away from the master cylinder piston, wherein the sleeve actuator is configured to bias the transfer piston toward the master cylinder piston in response to an applied boost pressure.

18 Claims, 8 Drawing Sheets

US 8,596,061 B2

DECOUPLED INLINE HYDRAULIC BOOSTER

FIELD

The invention relates to braking systems, and in particular to a braking system with a pedal feel simulator.

BACKGROUND

Significant progress has been made in vehicular braking systems in recent years. Among these developments are different braking strategies such as anti-lock braking systems (ABS) and regenerative braking systems. The latter is used in electric and hybrid-electric vehicles. These braking strategies are interchangeably blended in order to brake a vehicle. Typically, a vehicle's brake pedal is mechanically decoupled from downstream braking circuits. A control valve typically regulates boost pressure from an accumulator to provide a regulated boost pressure to the downstream braking circuits. Since the brake pedal is mechanically decoupled, a brake pedal feel simulator is typically included in a braking system in order to provide a feedback to the operator of the vehicle.

In the event of a failure of the hydraulic system and/or the electrical regenerative system, it is necessary for the braking system to switch modes of operation so that the brake pedal is mechanically coupled to the downstream brake circuits. In such a failure mode, the force applied to the brake pedal is transferred to the downstream brake circuits to generate the necessary braking force to halt a vehicle.

There is a need to provide an improved braking system that is operable in a normal mode in which the brake pedal is mechanically decoupled from the downstream braking circuits and also operable in a failure mode in which the brake pedal is at least mechanically coupled to one downstream braking circuit.

SUMMARY

According to one embodiment of the present disclosure, there is provided an in-line brake system with a hydraulic booster. The in-line brake system with a hydraulic booster includes a master cylinder defining a cylinder bore, a master cylinder piston located within the cylinder bore, a transfer piston located within the cylinder bore rearwardly of the master cylinder piston, a transfer piston actuator with a first seat, a sealing member aligned with the first seat, a sealing member spring operably connected to the sealing member and the transfer piston, an input rod aligned with the first seat, a return spring operably connected to the input rod and the transfer piston actuator, a sleeve actuator located within the cylinder bore rearwardly of the master cylinder, and a sleeve spring configured to bias the sleeve actuator away from the master cylinder piston, wherein the sleeve actuator is configured to bias the transfer piston toward the master cylinder piston in response to an applied boost pressure.

DESCRIPTION

Figure 1:
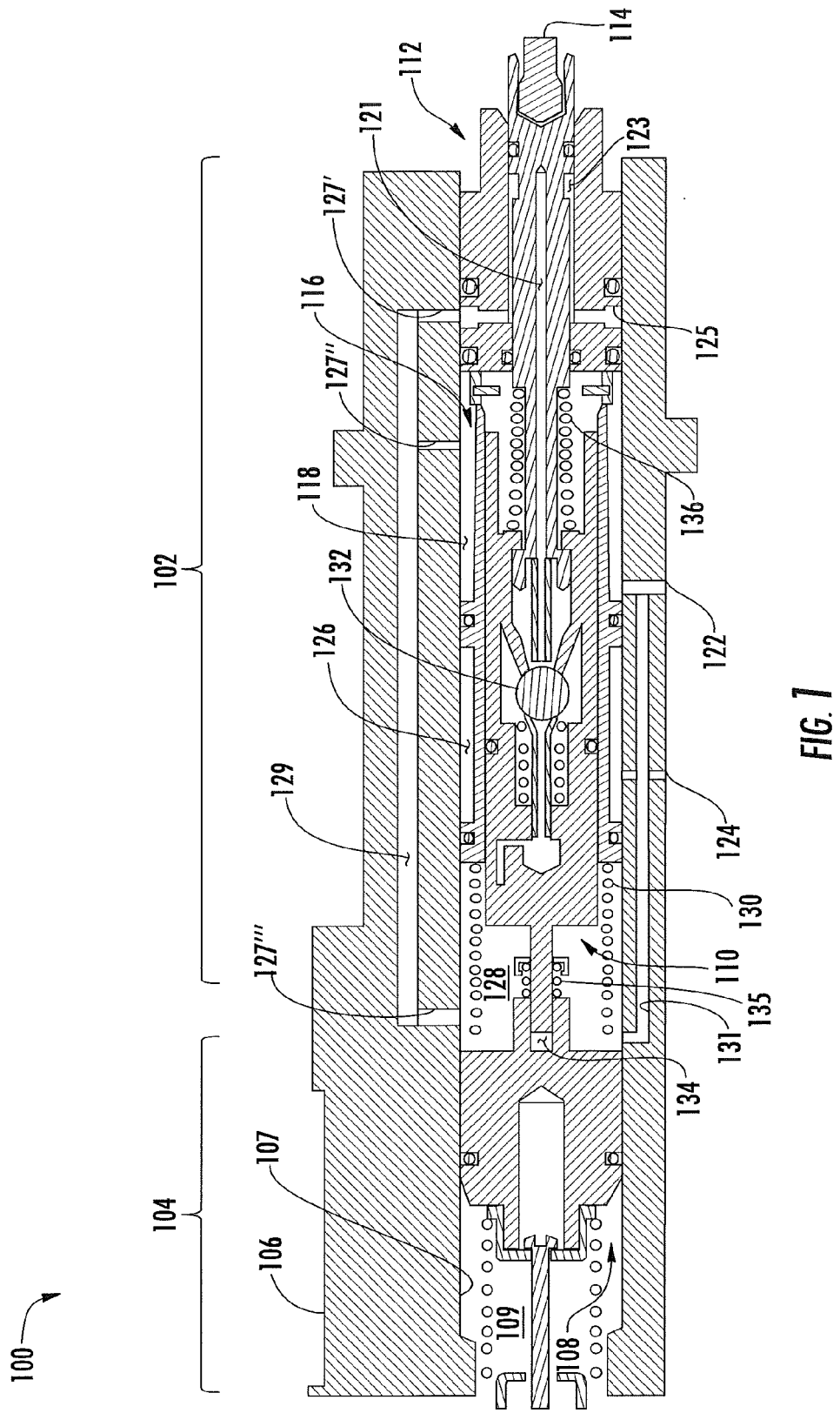
FIG. 1 depicts a partial cross sectional view of a braking system including a booster portion which has a transfer piston assembly, an input rod assembly, and a sleeve assembly, and a master cylinder portion which has a master cylinder piston assembly.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

Referring to FIG. 1, a partial cross sectional view of a braking system 100 is depicted. The braking system 100 includes a booster portion 102 and a master cylinder portion 104. The booster portion 102 and the master cylinder portion 104 are enclosed by a master cylinder 106 which extends over the boost portion 102 and the master cylinder portion 104. The master cylinder 106 has a bore 107 which extends over substantially the entire length of the master cylinder 106.

Within the bore 107, the braking system 100 includes a master cylinder piston assembly 108, a transfer piston assembly 110, and an input rod assembly 112. An input shaft 114 is coupled to a brake pedal (not shown) at one end and fixedly coupled to the input rod assembly 112 at another end. The input shaft 114 interfaces with the input rod assembly 112 in a press fit manner or other known manners in which the input shaft 114 can swivel with respect to the input rod assembly 112. The input shaft 114 is configured to transfer forces applied to the brake pedal (not shown) to the input rod assembly 112. The input rod assembly 112 is biased away from the transfer piston assembly 110 by an input rod spring 136. The input rod spring may also be referred to as the return spring 136. Also depicted in FIG. 1 is a sleeve assembly 116.

The master cylinder piston assembly 108 is sealingly positioned within the bore 107 of the master cylinder 106 and defines a master cylinder chamber 109 between the bore 107 and the master cylinder piston assembly 108. The master cylinder chamber 109 is in fluid communication with a first downstream braking circuit (not shown). The master cylinder chamber 109 is also in selective communication with a reservoir (not shown), as described in greater detail below.

The sleeve assembly 116 and the bore 107 define a first sleeve chamber 118 which is in fluid communication with a fluid channel 121. The fluid channel 121 is also in fluid communication with a second downstream braking circuit (not shown) via an outlet 122. Specifically, an accumulator (i.e., source of high pressure fluid, not shown) is in selective fluid communication with a fluid channel 121, as described in greater detail below. The fluid channel 121 is in fluid communication with a chamber 123 which is in fluid communication with outlets 125. The outlets 125 are in fluid communication with a radial fluid channel 127' which is fluidly coupled to an axial fluid channel 129. The axial fluid channel 129 is coupled to a radial fluid channel 127" which is in fluid communication with the first sleeve chamber 118. The first sleeve chamber 118 is in fluid communication with the outlet 122, which as described above, is in fluid communication with the second braking circuit (not shown).

An inlet 124 provides fluid communication between the reservoir (not shown) and a second sleeve chamber 126 which is defined by the sleeve assembly 116 and the bore 107. Therefore, the second sleeve chamber 126 is in continuous fluid communication with the reservoir (not shown).

The bore 107, the master cylinder piston assembly 108, and the transfer piston assembly 110 define a boost chamber 128 which is in fluid communication with the axial fluid channel 129 via a radial fluid path 127''' and via another fluid path 131. Since the internal fluid chamber is in fluid communication with the first sleeve chamber 118 and with the boost chamber 128, the boost chamber 128 is also in fluid communication with the first sleeve chamber 118. The transfer piston assembly 110 is also sealingly coupled to the sleeve assembly 116, as will be discussed in greater detail below.

The master cylinder piston assembly 108 and the sleeve assembly 116 are biased away from each other by a sleeve spring 130. The sleeve spring 130 is positioned within the boost chamber 128 and is configured to compress as distance between the master cylinder piston assembly 108 and the sleeve assembly 116 decreases.

A sealing member 132 is disposed between the transfer piston assembly 110 and the input rod assembly 112. The sealing member 132 is substantially in the form of a ball. As will be described more fully below, the sealing member 132 is configured to seal the fluid channel 121 from the accumulator (not shown) when the brake pedal (not shown) is in a released position (i.e., in an unactuated position). Furthermore, as discussed below, the sealing member 132 is configured to modulate fluid pressure within the fluid channel 121 in response to a force applied to the brake pedal (not shown).

As depicted in FIG. 1, there is a gap 134 between the master cylinder piston assembly 108 and the transfer piston assembly 110. A spring 135 disposed between the master cylinder piston assembly 108 and the transfer piston assembly 110 is configured to bias the master cylinder piston assembly 108 and the transfer piston assembly 110 away from each other.

Figure 2:
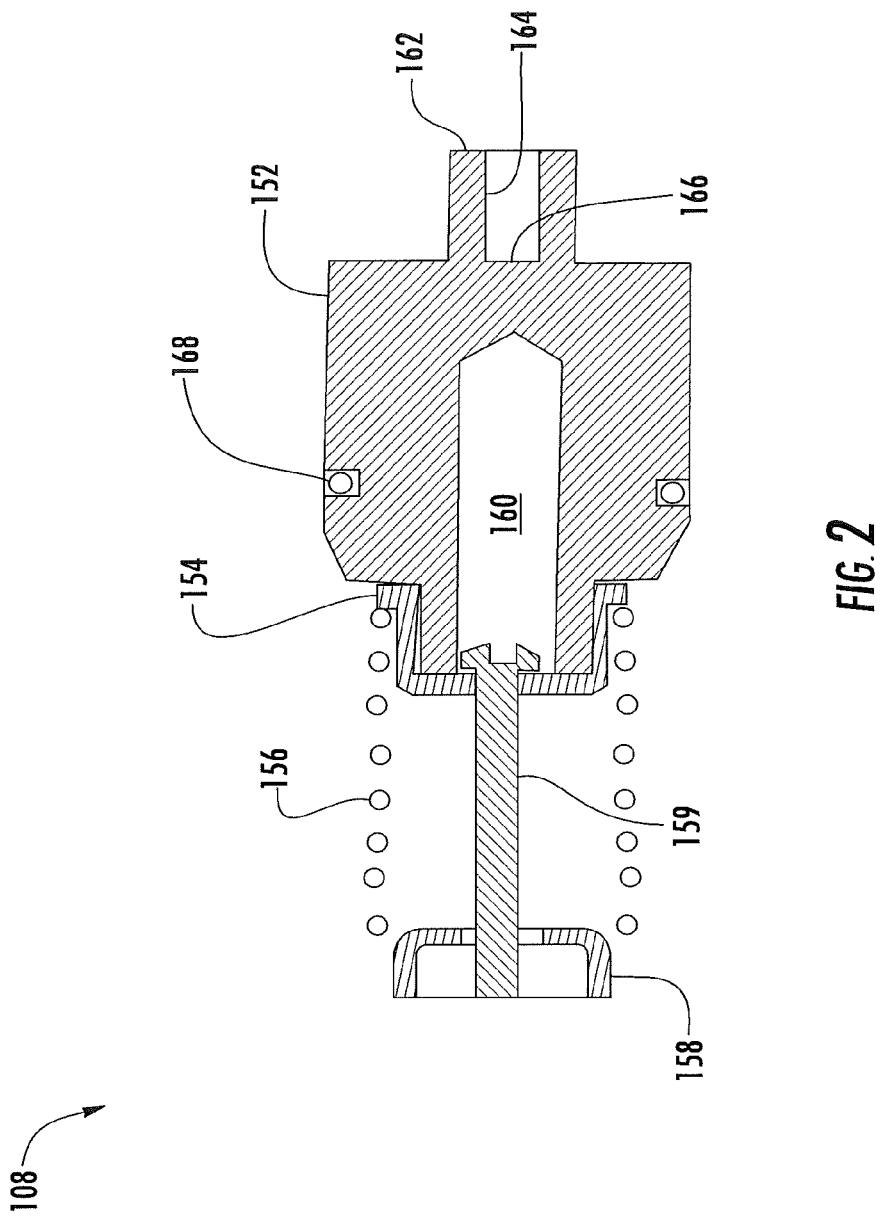
FIG. 2 depicts a partial cross sectional view of the master cylinder piston assembly of FIG. 1.

Referring to FIG. 2, a partial cross sectional view of the master cylinder piston assembly 108 is depicted. The master cylinder piston assembly 108 includes a body portion 152, a master cylinder piston bracket 154, a master cylinder piston spring 156, and a master cylinder end bracket 158. The body portion 152 is fixedly coupled to the master cylinder piston bracket 154, e.g., in a press fit manner.

The master cylinder piston spring 156 biases the master cylinder piston bracket 154 away from the master cylinder end bracket 158. The body portion 152 is coupled to a master cylinder valve assembly, e.g., a poppet valve (not shown), via a piston rod 159 which centrally extends through the master cylinder piston bracket 154. The piston rod 159 is slidably disposed within a central cavity 160 of the body portion 152.

The body portion 152 further includes a rear portion 162. The rear portion 162 includes a transfer piston interface 164 which provides a sealing surface for the transfer piston assembly 110, as further described below. The transfer piston interface 164 terminates at an end surface 166 which is also configured to interface with the transfer piston assembly 110. In addition, the seal 168 provides a sealed interface between the body portion 152 and the bore 107 of the master cylinder 106.

Figure 3:
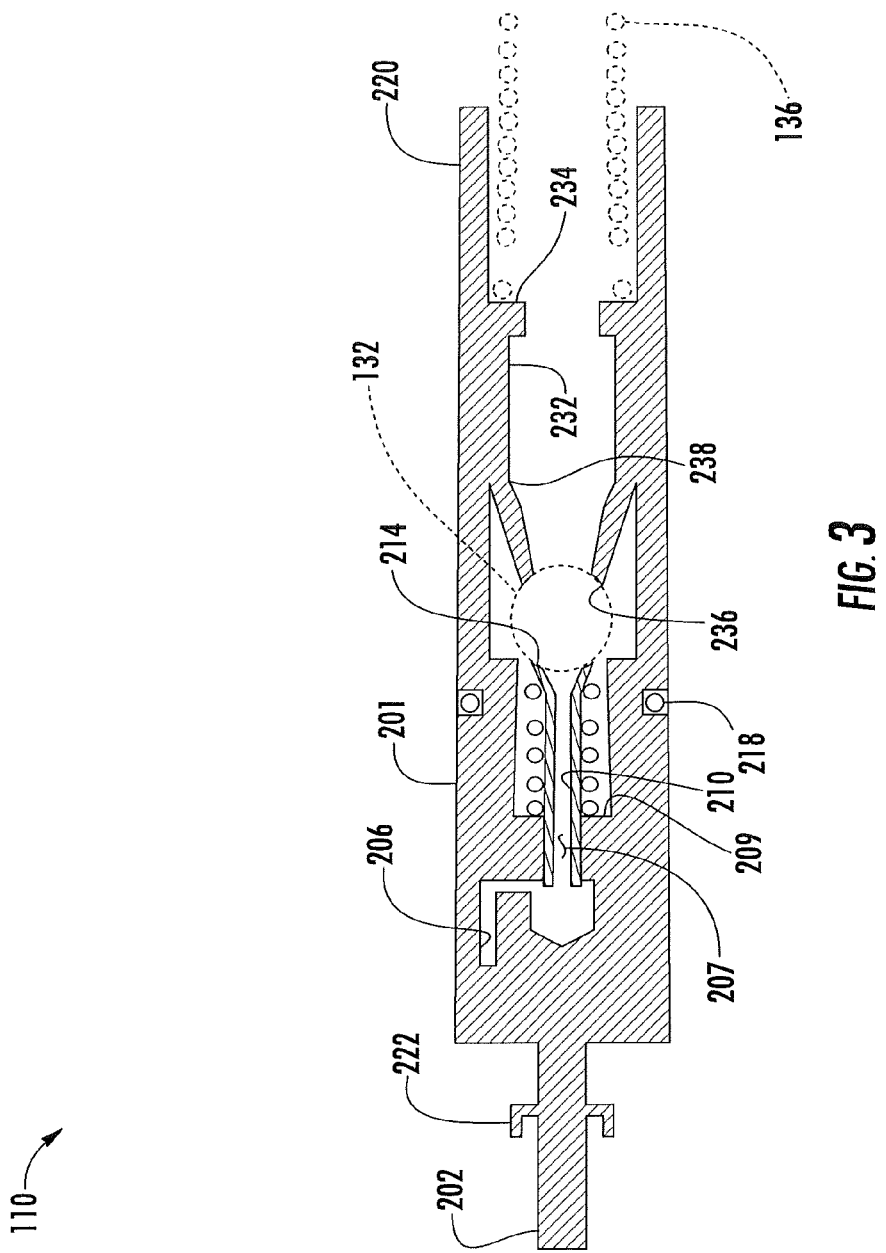
FIG. 3 depicts a partial cross sectional view of the transfer piston assembly of FIG. 1, including an actuator shown in phantom.

Referring to FIG. 3, a partial cross sectional view of the transfer piston assembly 110 is depicted. The transfer piston assembly 110 includes a body portion 201, and a nose portion 202. The nose portion 202 is an extension of the body portion 201 and is configured to be positioned within the rear portion 162 of the master cylinder piston assembly 108. Specifically, the transfer piston interface 164 encloses a portion of the nose 202 (see also FIGS. 1 and 2).

The transfer piston assembly 110 also includes an inlet 206 which is fluidly coupled to the accumulator (not shown). The inlet 206 provides a fluid channel 207 between the accumulator (not shown) and the sealing member 132 (shown in phantom).

The transfer piston assembly 110 also includes a control valve spring 208, an inlet portion 209, and an inlet member 210. The control valve spring 208, is hereinafter also referred to as the sealing member spring. The control valve spring 208 biases the inlet member 210 away from the inlet portion 209. As depicted in FIG. 3, the inlet member 210 is slidably disposed within the fluid channel 207, and is configured to move therein. Due to the control valve spring 208, the inlet member 210 is positioned to make contact with the sealing member 132 (shown in phantom, with reference to FIG. 3). The inlet member 210 terminates at a contact ring 214 which is configured to interface with the sealing member 132. The contact ring 214 may be integrally formed with the inlet member 210 or may be a member that can be separated and replaced due to wear.

As depicted in FIG. 3, the sealing member 132 (shown in phantom) contacts a transfer piston actuator 232. The transfer piston actuator 232 is integrally formed with the body portion 201. The transfer piston actuator includes a first seat 236 and a second seat 238. The first seat 236 is configured to seal against the sealing member 132 and thereby seal the fluid channel 121, as described further below. The first seat 236 may be an integrally formed part of the body portion 232 or may be a separate member configured to be assembled on to the body portion 232 and also to be removed for service due to wear. The second seat 238 is configured to contact a seat 261 of the input rod assembly 112, as described further below. The transfer piston actuator 232 also includes a rear portion 220. The rear portion 220 includes a seat 234 which is configured to provide a seat for the spring 136 (shown in phantom). The spring 136 is positioned between the seat 234 and the input rod assembly 112. The spring 136 is configured to bias the transfer piston assembly 110 and the input rod assembly 112 away from each other during actuation of the braking system 100 as discussed below and also with reference to FIG. 4.

Figure 4:
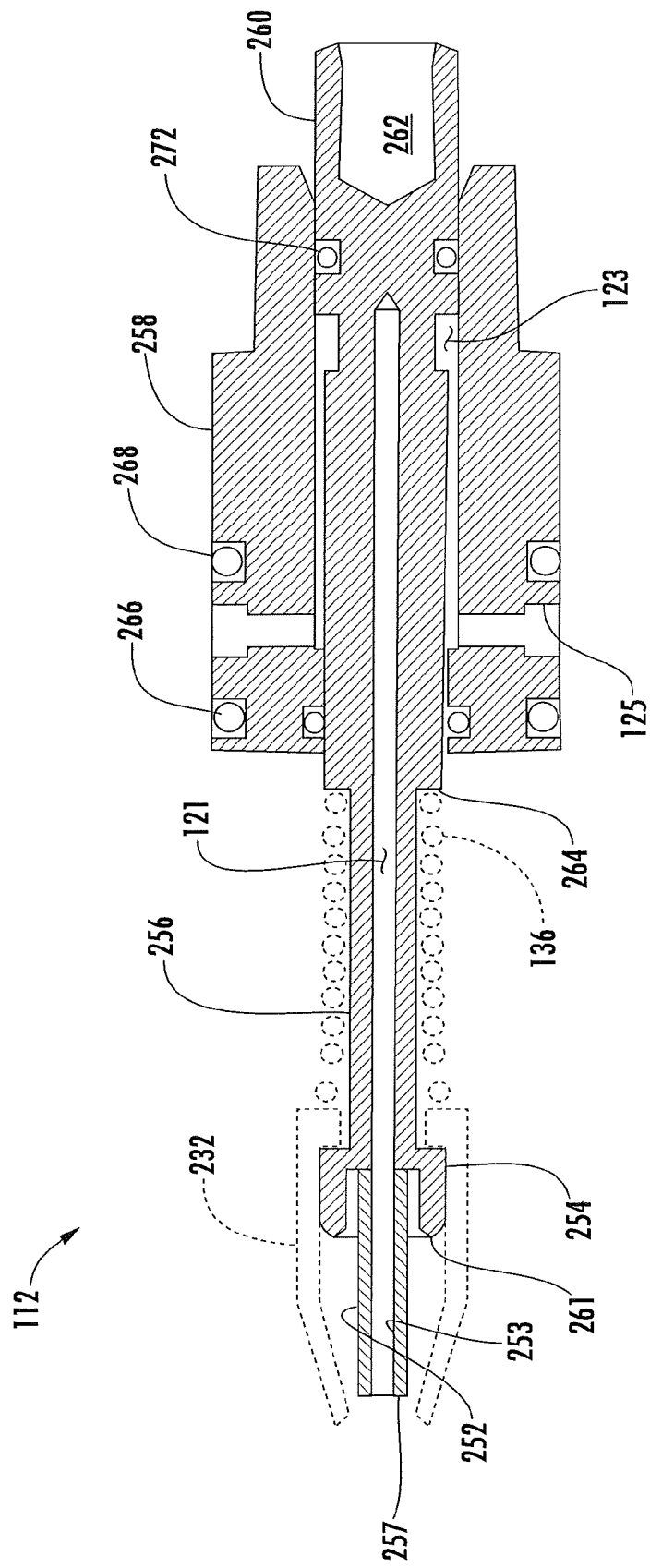
FIG. 4 depicts a partial cross sectional view of the input rod assembly of FIG. 1 including a seal member actuator.

Referring to FIG. 4, a partial cross sectional view of the input rod assembly 112 is depicted. The input rod assembly 112 includes a pin 252, a collar 254, an input rod 256, and a body portion 258. The pin 252 includes a bore 253 which is aligned with the fluid channel 121. The pin 252 defines an end 257 which is configured to make contact with the sealing member 132, as further described below, and in doing do establish fluid communication between the accumulator (not shown), the surroundings of the sealing member 132, the bore 253, and the fluid channel 121 (see FIG. 1). The end 257 may include a castelating feature that enables the end 257 to contact the sealing member 132 while providing an unobstructed fluid path to the bore 253.

The collar 254 includes a seat 261 which is configured to come in contact with the second seat 238 of the transfer piston actuator 232 (see FIG. 3) under certain operational conditions as described further below.

The collar 254 may be integrally formed with the input rod 256. The input rod 256 includes a bore which defines the fluid channel 121. The input rod 256 also defines a step 264. The step 264 is configured to receive one end of the input rod spring 136, while as discussed above, the seat 234 of the rear portion 220 of the transfer piston actuator 232 is configured to receive the other end (see FIG. 3). The input rod 256 is slidably coupled to the body portion 258 (i.e., the input rod 256 can slide with respect to the body portion 258).

The body portion 258 includes seal housings for receiving seals 266 and 268. The seals 266 and 268 seal the input rod assembly 112 against the bore 107 of the master cylinder 106. The body portion 258 also includes a seal housing for receiving a seal 270. The input rod 156 also includes a seal housing for receiving a seal 272. The seals 270 and 272 seal the input rod against the body portion 258.

The interface between the input rod 256 and the body portion 258 defines the chamber 123, which as discussed above is in fluid communication with the fluid channel 121 and the outlet 125.

The input rod 245 further includes a rear portion 260 which defines a cavity 262. The cavity 262 is configured to receive the input shaft 114, as described above, in a press fit manner in which the input shaft 114 once inside the cavity 262 is allowed to swivel with respect to input rod 256.

Figure 5:
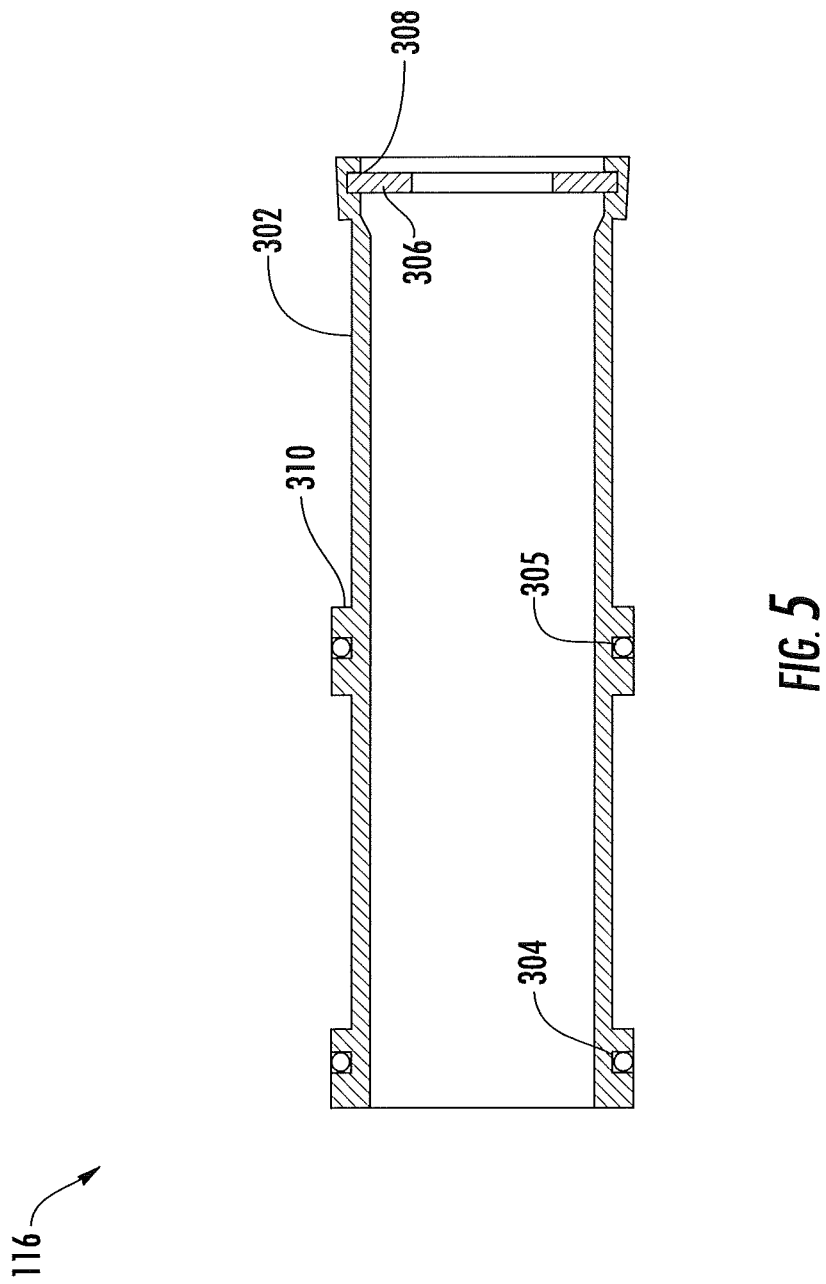
FIG. 5 depicts a partial cross sectional view of the sleeve assembly of FIG. 1.

Referring to FIG. 5, a partial cross sectional view of the sleeve assembly 116 is provided. The sleeve assembly 116 includes a sleeve 302 and seal housings for receiving seals 304 and 305. The sleeve 302 includes a radial notch 308 for receiving a retaining ring 306. The retaining ring 306 defines an inner diameter that is larger than the outer diameter of the input rod spring 136 and the outer diameter of the input rod 256 (see FIGS. 3 and 4). Therefore, the input rod 256 can slide through the retaining ring 306, while compressing the input rod spring 136 without interference with the inner diameter of the retaining ring 306. The seal housing for the seal 306 defines an active face 310 for communicating with fluid within the first sleeve chamber 118.

The operation of the braking system 100 is described herein with initial reference to FIG. 1. Two modes of operation are described. In general, during a normal mode of operation, the accumulator (not shown) supplies high pressure fluid to the braking system 100 in order to provide a hydraulic boost function, known in the art. In a failure mode, however, the accumulator is unable to supply the high pressure fluid, and thereby no boost function is provided.

Referring back to FIG. 1, general operational conditions with respect to both normal and failure modes are described. The input shaft 114 is coupled to the brake pedal (not shown). The brake pedal (not shown) in a released position results in the position of the braking system 100 that is depicted in FIG. 1, which is hereinafter referred to as the "rest" position.

Starting with the master cylinder piston assembly 108 and its fluid coupling to the first downstream braking circuit (not shown) and the reservoir (not shown), the body portion 152 is biased rightward. This is because, the body portion 152 is fixedly coupled to the master cylinder piston bracket 154, and the master cylinder piston spring 156 biases the master cylinder piston bracket 154 away from the master cylinder end bracket 158 (see FIG. 2).

The piston rod 159 is coupled to the master cylinder valve assembly (not shown) on the left side of the piston rod and coupled to the master cylinder piston bracket 154 on the right side. The master cylinder piston bracket 154 limits leftward travel of the piston rod 159 beyond the position that is depicted in FIG. 1.

The transfer piston assembly 110 is disposed to the right (rearwardly) of the master cylinder piston assembly 108. The control valve spring 208 biases the inlet member 210 away from the inlet portion 209 and into contact with the sealing member 132. (see FIG. 3). Therefore, the sealing member 132 is biased rightward and is thereby firmly seated on the first seat 236 of the transfer piston actuator 232.

With the first seat 236 firmly seated on the sealing member 132 the fluid channel 121 is isolated from fluid communication with the accumulator (not shown).

In FIG. 1, the end 257 of the pin 252 is positioned proximate to the sealing member 132. The end 257 is depicted to be substantially out of contact with the sealing member 132 only to make it clear to the reader that the pin 252 is exerting minimal or zero force on the sealing member 132, in the rest position. Also, in the rest position, the input rod spring 136 which is disposed between the step 264 of the input rod 256 and the seat 234 of the transfer piston actuator 232 is minimally compressed, or simply not compressed at all.

The sleeve assembly 116 is biased away from the master cylinder piston assembly 108 by the sleeve spring 130. As a result the sleeve assembly 116 is in contact with the body portion 258 of the input rod assembly 112.

In the rest position, the master cylinder chamber 109 is in fluid communication with the reservoir (not shown) via the master cylinder valve assembly (not shown). The master cylinder chamber 109 is also in fluid communication with the first downstream circuit (not shown). Therefore, pressure within the master cylinder chamber 109 and the first downstream braking circuit (not shown) is negligible (i.e., the same as the fluid pressure of the reservoir, not shown).

The accumulator (not shown) provides high pressure fluid to the transfer piston assembly 110 at the inlet 206 (see FIG. 3). On the inlet member 210 side of the sealing member 132 the pressure is the same as the accumulator pressure. Since the sealing member 132, however, is firmly seated on the first seat 236 (see FIG. 3), the bore 253 and the fluid channel 121 are fluidly isolated from the accumulator (not shown). Therefore, in the rest position, pressure within the bore 253, the fluid channel 121, the chamber 123, the outlet 125, the radial fluid channels 127', 127'', and 127''', and the second downstream braking circuit (not shown) are negligible. Also, since the boost chamber 128 is in fluid communication with the fluid channel 121, fluid pressure within the boost chamber is also negligible.

Figure 6:
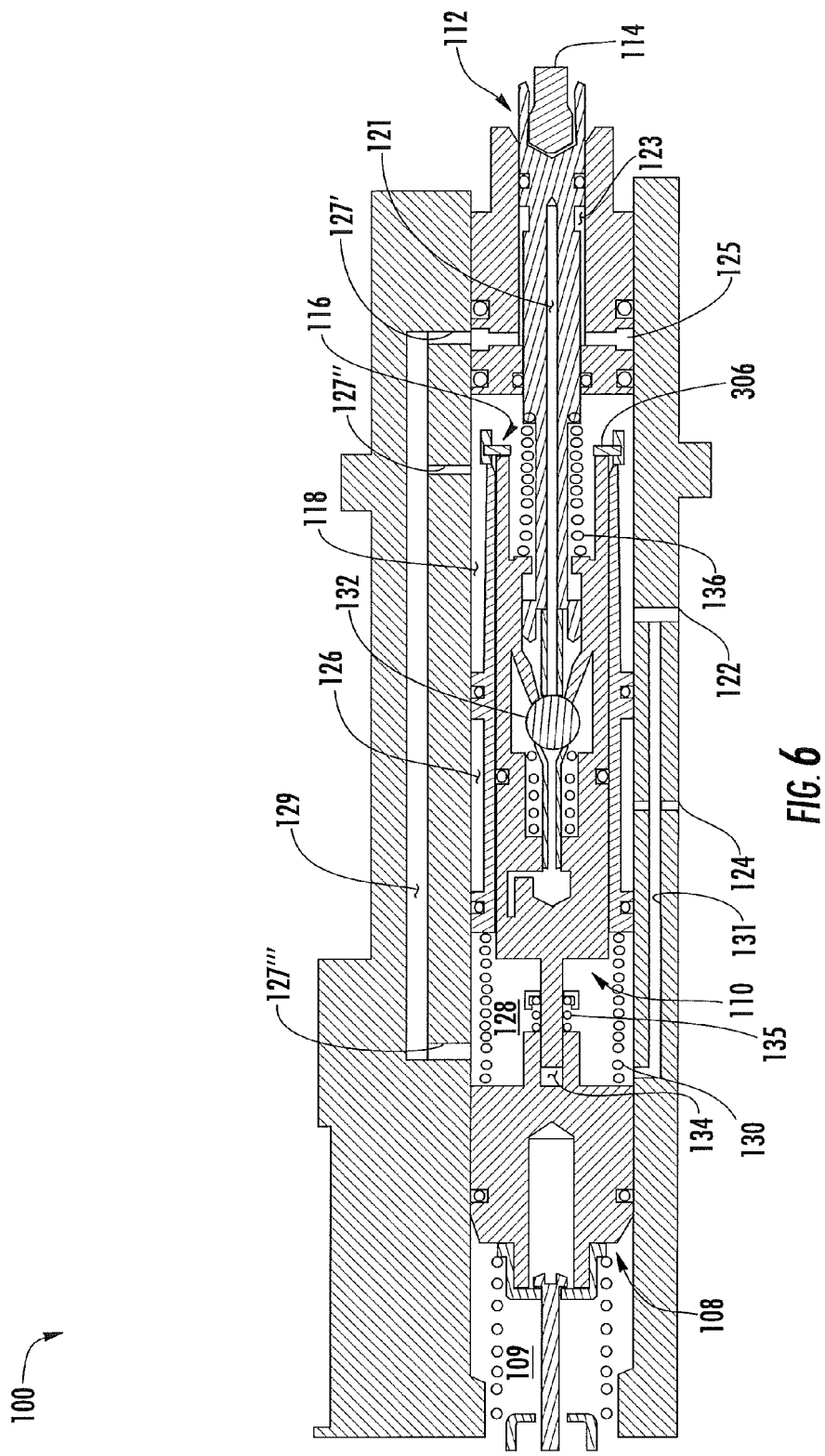
FIG. 6 depicts the braking system of FIG. 1 in an initial actuation position in a normal operating mode, wherein a seal member actuator has moved leftward and has caused leftward movement of a seal member off of a first seat to thereby provide regulated high pressure fluid to the sleeve assembly.

Referring to FIG. 6, an initial actuation position of the braking system 100 in the normal mode is depicted. When an operator of the vehicle applies a force to the brake pedal (not shown), the input shaft 114 moves leftward. Leftward movement of the input shaft 114 moves the input rod 256 of the input rod assembly 112 leftward in the direction of an arrow 300. Since the input rod spring 136 is disposed between the step 264 of the input rod 256 (see FIG. 4) and the seat 234 of the transfer piston actuator 232 (see FIGS. 3 and 4), leftward movement of the input rod 256 biases the transfer piston actuator 232 leftward by the force of the input rod spring 136. The pin 252 which is disposed between the collar 254 and the sealing member 132 comes in contact with the sealing member 132. The pin 252 applies a leftward force to the sealing member 132 which is transferred to the control valve spring 208. The spring constant of the control valve spring 208, the spring 135, and the master cylinder piston spring 156 are chosen so that the control valve spring 208 begins to compress. The compression of the control valve spring 208 allows the end 257 of the pin 252 to unseat the sealing member 132 from the first seat 236.

The unseating of the sealing member 132 from the first seat 236 provides fluid communication between the accumulator (not shown) and the fluid channel 121 via the bore 253 (see also FIG. 4) by allowing fluid to rush by the first seat 236. The pressure within the fluid channel 121 is proportional to the force applied by the operator to the brake pedal (not shown). Therefore, the sealing member 132 and the first seat 236 regulate the pressure within the fluid channel 121.

The rushing fluid around the first seat 236 moves into the fluid channel 121. Since the fluid channel 121 is in fluid communication with the first sleeve chamber 118, pressure rises therein. With the second sleeve chamber being coupled to the reservoir (not shown), pressure within the first sleeve chamber 118 rises above pressure within the second sleeve chamber 126. The pressure differential between these chambers 118 and 126 causes the sleeve assembly 116 to move leftward in the direction of the arrow 300 against a biasing force provided by the sleeve spring 130 positioned between the sleeve 302 and the master cylinder piston assembly 108. In response to the leftward movement of the sleeve assembly 106, the retaining ring 306 also moves leftward, thereby contacting the rear portion 220 of the transfer piston assembly 110, as depicted in FIG. 6.

Furthermore, since the fluid channel 121 is also fluidly coupled to the boost chamber 128, pressure rises therein as well. Fluid pressure within the boost chamber 128 actuates the master cylinder piston assembly 108 and moves it leftward. Leftward movement of the master cylinder piston assembly 108 closes the master cylinder valve assembly (not shown) and thereby isolates the master cylinder chamber 109 from the reservoir (not shown). Therefore, fluid pressure within the master cylinder chamber 109 begins to rise as the master cylinder piston assembly 108 moves leftward.

With the first and second downstream braking circuits coupled to the master cylinder chamber 109 and the fluid channel 121, respectively, pressures within these circuits begin to rise, thereby providing the desired braking function. The reader should appreciate that the spring constant of the spring 135 ($K_{135}$) is higher than the spring constant of the input rod spring 136 ($K_{136}$) which is higher than the spring constant of the control valve spring 208 ($K_{208}$). That is, $K_{135} > K_{136} > K_{208}$.

Figure 7:
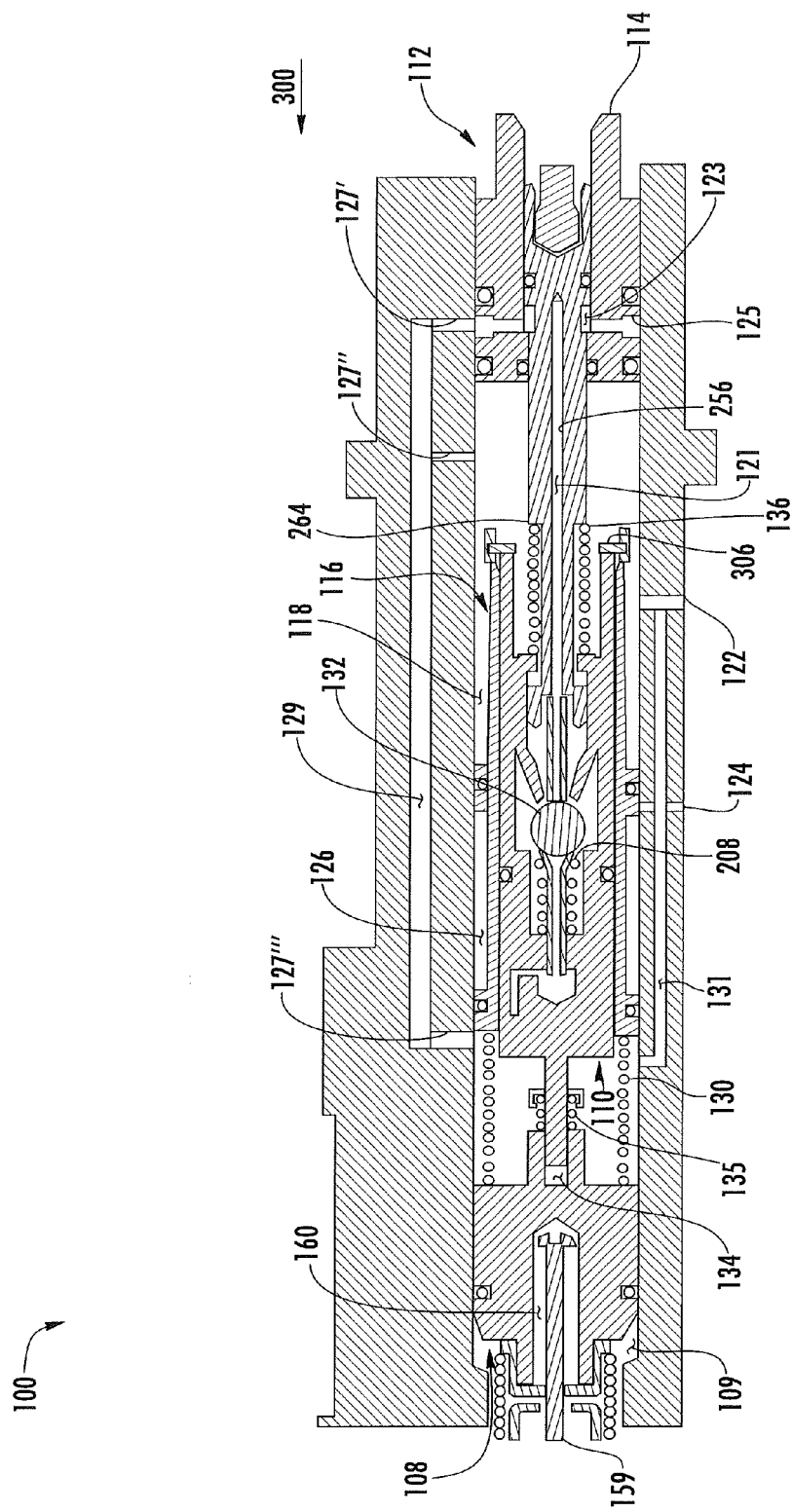
FIG. 7 depicts the braking system of FIG. 1 in an actuated position in the normal mode, wherein the seal member actuator has moved further leftward as compared to FIG. 6, thereby increasing pressure of the regulated high pressure fluid within the sleeve assembly.

An increase in the force applied to the brake pedal (not shown) by the operator generates further leftward movement of the input shaft 114. Referring to FIG. 7, a subsequent actuated position of the braking system 100 in the normal mode of operation is depicted. In the subsequent actuated position, the input rod 256 has further moved leftward in the direction of the arrow 300, which has caused the pin 252 to further move leftward. The leftward movement of the pin 252 has further moved the sealing member 132, thereby further unseating the sealing member 132 from the first seat 236 as compared to the position of the sealing member 132 of FIG. 6. As a result, pressure within the fluid channel 121 increases, which increases pressures within the first sleeve chamber 118 and the boost chamber 128. The reader should appreciate that the relative positions of the first seat 236 and the sealing member 132 are depicted in an exaggerated manner for clarity. In reality, a very small space is provided between the sealing member 132 and the first seat 236.

With the increased pressure in the boost chamber 128, the master cylinder piston assembly 108 moves further leftward causing pressure within the master cylinder chamber 109 to further increase. Notably, the piston rod 159 moves within the central cavity 160.

Further leftward movement of the master cylinder piston assembly 108 generates increased pressure in the first downstream braking circuit (not shown). Similarly, increased pressure within the fluid channel 121 results in increased pressure in the second downstream braking circuit (not shown).

The leftward movement of the master cylinder piston assembly 108 has the potential of increasing the gap 134, however, as described below the braking system 100 is configured to maintain the gap 134.

The increased pressure within the fluid channel 121 increases pressure within the first sleeve chamber 118. As discussed above, pressure within the second sleeve chamber 126 remains at the pressure of the reservoir (not shown). Therefore, the pressure differential between the first and second sleeve chambers 118 and 126 increases. Because of the increased pressure differential, the sleeve assembly 116 moves further leftward, which moves the retaining ring 306 further leftward. Since the retaining ring 306 is already in contact with the rear portion 220 of the transfer piston assembly 110, as depicted in FIG. 6, the further leftward movement of the retaining ring 306 causes further leftward movement of the transfer piston assembly 110.

The active face 310 of the sleeve assembly 116 is so dimensioned that regulated pressure of fluid within the fluid channel 121 (and thereby within the first sleeve chamber 118) acting on it provides sufficient leftward force (and thereby leftward movement) to overcome the biasing force of the sleeve spring 130. By choosing the appropriate spring constant of the spring 130 and dimensions of the active face 310, the leftward movement of the sleeve assembly 116, and therefore the transfer piston assembly 110, can be matched to the leftward movement of the master cylinder assembly 108, to thereby maintain the gap 134.

Since the brake pedal (not shown) is mechanically decoupled from the downstream braking circuits (not shown), the input rod spring 136 and the control valve spring 208 provide a feedback to the operator in the normal mode through the sealing member 132, the pin 252, the input rod 256, and the input shaft 114.

Figure 8:
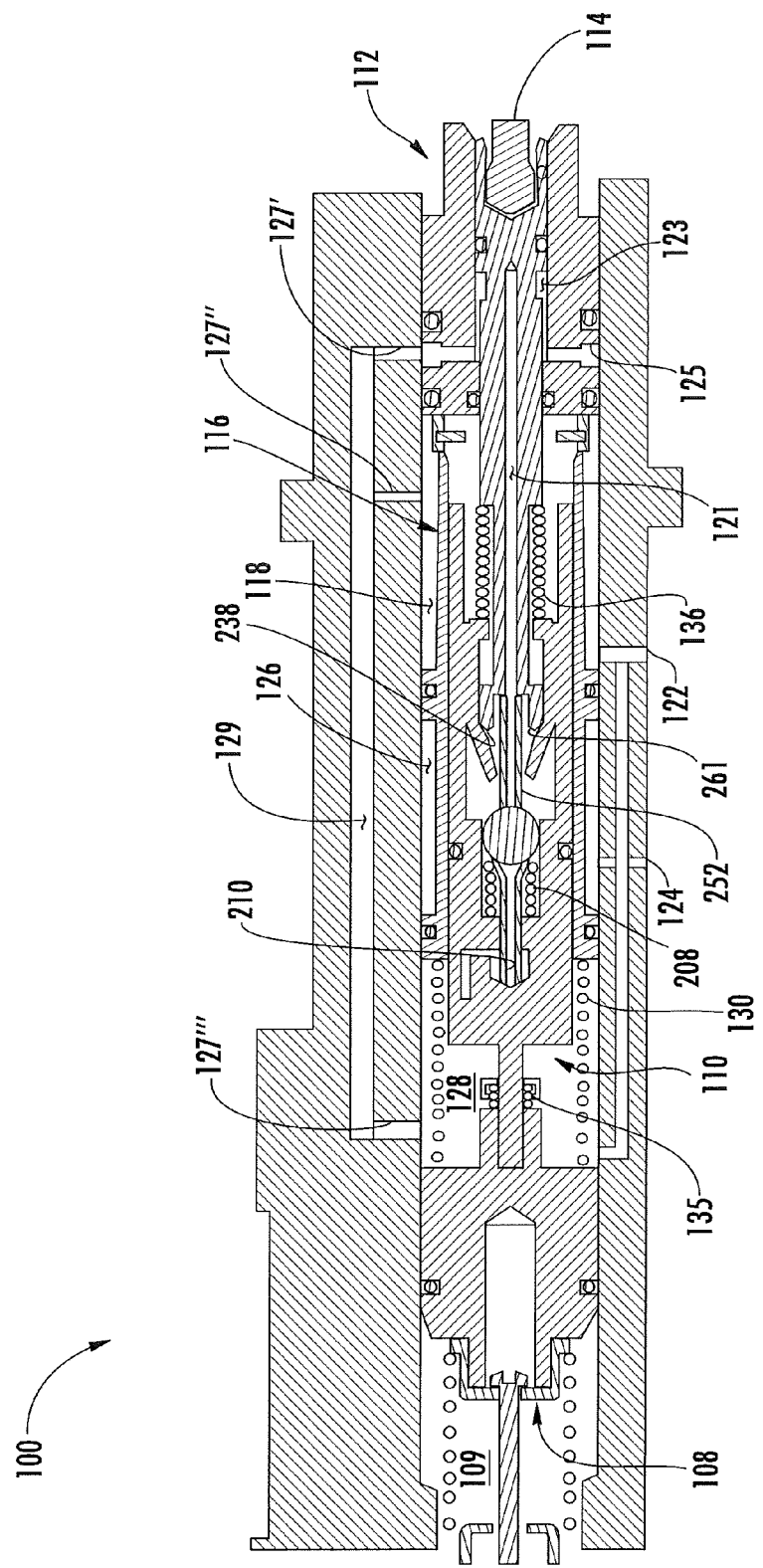
FIG. 8 depicts the braking system of FIG. 1 in an initial actuation position in a failure operating mode, wherein the high pressure fluid is inoperative and the seal member cannot regulate pressure within the sleeve assembly.

In the failure mode, the accumulator (not shown) is unable to supply fluid at a pressure necessary to provide the boost function. In reference to FIG. 8, an initial actuated position of the braking assembly 100 in the failure mode is depicted. In the failure mode, the braking system 100 operates similar to the normal mode, with few differences. Since the accumulator (not shown) is inoperative, the pressure within the fluid channel 121 remains low. As a result, there is no braking generated in the second downstream braking circuit (not shown). Pressures within the boost chamber 128 and the first sleeve chamber 118 remain low, thereby affecting no leftward forces for moving the master cylinder piston assembly 108 and the sleeve assembly 116.

In the failure mode, however, braking is generated in the first downstream braking circuit (not shown), as described below. The leftward movement of the input rod 256 compresses the input rod spring 136 and firmly brings the pin 252 into contact with the sealing member 132. The sealing member 132 compresses the control valve spring 208, which moves the inlet member 210 into the fluid channel 207 so that the inlet member 210 approaches the end of a cavity defined by the fluid channel 207. Meanwhile, the input rod spring 126 compresses and the seat 261 of the collar 254 approaches the second seat 238.

The inlet member 210, the cavity defined by the fluid channel 207, and the distance between the collar 254 and the second seat 238, as depicted in FIG. 1, are dimensioned so that when the inlet member 210 bottoms out in the cavity defined by the fluid channel 207, the seat 261 makes contact with the second seat 238 of the transfer piston actuator 232.

As the seat 261 comes into contact with the second seat 238, a direct linkage between the brake pedal (not shown) and the transfer piston actuator 110 establishes. This linkage includes the input shaft 140, the input rod 256, the collar 254, the seat 261, the second seat 238, and the body portion 201.

With the direct linkage established, further movement of the input rod 256 moves the transfer piston assembly 110 leftward. Since the master cylinder piston assembly 108 has not moved (due to lack of pressure in the boost chamber 128, and the spring constant of the spring 135 being higher than the input rod spring 136), movement of the transfer piston assembly 110 eliminates the gap 134, as a front portion of the nose 202 comes in contact with the end surface 166, causing the spring 136 to compress. Further leftward movement of the input rod 256, results in leftward movement of the master cylinder piston assembly 108 which generates the desired braking function.

In an alternative embodiment, the second braking circuit (not shown) may be in fluid communication with a second master cylinder chamber (not shown) as is known in a tandem master cylinder assembly. In this embodiment, the fluid in the second master cylinder chamber (not shown) may be pressurized by leftward movement of a second master cylinder piston (not shown) which is mechanically coupled (via a spring) or fluidly coupled to the master cylinder piston assembly 108. In this embodiment, the second downstream braking circuit (not shown) may also provide the desired braking function in the failure mode.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. An in-line brake system with a hydraulic booster comprising:
    a master cylinder defining a cylinder bore;
    a master cylinder piston located within the cylinder bore;
    a transfer piston located within the cylinder bore rearwardly of the master cylinder piston, the transfer piston and the master cylinder defining a boost chamber therebetween;
    a transfer piston actuator with a first seat;
    a sealing member aligned with the first seat;
    a sealing member spring operably connected to the sealing member and the transfer piston;
    an input rod aligned with the first seat;
    a return spring operably connected to the input rod and the transfer piston actuator;
    a sleeve actuator located within the cylinder bore rearwardly of the master cylinder; and
    a sleeve spring positioned within the boost chamber and configured to bias the sleeve actuator away from the master cylinder piston, wherein the sleeve actuator is configured to bias the transfer piston toward the master cylinder piston in response to an applied boost pressure.

2. The system of claim 1, wherein:
    the master cylinder piston includes a rear portion;
    the transfer piston includes a forward portion; and
    the system is configured such that the rear portion is spaced apart from the forward portion in a released condition, and the rear portion is engaged with the forward portion in a first actuated condition.

3. The system of claim 2, wherein the system is further configured such that the rear portion is spaced apart from the forward portion in a second actuated condition.

4. The system of claim 3, wherein:
    the rear portion comprises a cavity; and
    the forward portion comprises a nose aligned with the cavity.

5. The system of claim 1, further comprising:
    a retaining ring attached to the sleeve actuator and configured to force the transfer piston toward the master cylinder piston in response to an applied boost pressure.

6. The system of claim 5, wherein:
    the transfer piston includes a rear surface; and
    the retaining ring extends inwardly from the sleeve actuator to a location axially adjacent to the rear surface.

7. The system of claim 5, wherein the sleeve actuator encircles a portion of the transfer piston.

8. The system of claim 1, wherein:
    the transfer piston actuator includes an internal cavity; and
    the input rod includes a sealing collar ring positioned within the internal cavity.

9. The system of claim 8, wherein:
    the internal cavity includes a cylindrical portion and a tapered portion;
    the tapered portion tapers inwardly and forwardly from the cylindrical portion;
    a second seat is located on a rear portion of the tapered portion; and
    the first seat is located at a forward portion of the tapered portion.

10. The system of claim 8, wherein the sealing member is a spherical sealing member.

11. The system of claim 10, wherein:
    the transfer piston comprises a rearward facing cavity; and
    the sealing member, the sealing member spring, the transfer piston actuator, and the sealing ring are located within the rearward facing cavity.

12. The system of claim 11, wherein the sleeve actuator encircles a portion of the transfer piston.

13. The system of claim 12, wherein at least a portion of the return spring is located within the rearward facing cavity.

14. The system of claim 1, wherein the sleeve actuator and the cylinder bore define a sleeve chamber and the input rod defines a fluid channel in fluid communication with the sleeve chamber.

15. The system of claim 14, wherein the master cylinder defines an axial fluid channel in fluid communication with the boost chamber.

16. The system of claim 15, wherein the master cylinder defines a radial fluid channel fluidically coupled to the boost chamber through the axial fluid channel.

17. The system of claim 16, wherein the master cylinder defines an outlet in fluid communication the boost chamber, wherein the outlet is in fluid communication with a braking circuit.

18. An in-line brake system with a hydraulic booster comprising:
    a master cylinder defining a cylinder bore;
    a master cylinder piston located within the cylinder bore, the master cylinder piston including a rear portion;
    a transfer piston including a forward portion, the transfer piston located within the cylinder bore rearwardly of the master cylinder piston;

a transfer piston actuator with a first seat;
a sealing member aligned with the first seat;
a sealing member spring operably connected to the sealing member and the transfer piston;
an input rod aligned with the first seat;
a return spring operably connected to the input rod and the transfer piston actuator;
a sleeve actuator located within the cylinder bore rearwardly of the master cylinder; and
a sleeve spring configured to bias the sleeve actuator away from the master cylinder piston, wherein the sleeve actuator is configured to bias the transfer piston toward the master cylinder piston in response to an applied boost pressure wherein the system is configured such that the rear portion is spaced apart from the forward portion in a released condition, the rear portion is engaged with the forward portion in a first actuated condition, and the rear portion is spaced apart from the forward portion in a second actuated condition and boost pressure is applied in the second actuated condition; and
the sleeve spring and the boost pressure are selected such that the distance between the rear portion and the forward portion in the released condition is substantially the same as the distance between the rear portion and the forward portion in the second actuated condition.

* * * * *